Nov. 16, 1965     J. H. SCHNEIDER ET AL     3,217,709
DRIP METER WITH REFLECTOR FOR FACILITATING THE COUNTABILITY OF
TRANSPARENT AND TRANSLUCENT DROPS OF LIQUID AT LOW
LEVELS OF GENERAL ILLUMINATION
Filed Dec. 27, 1962     3 Sheets-Sheet 1
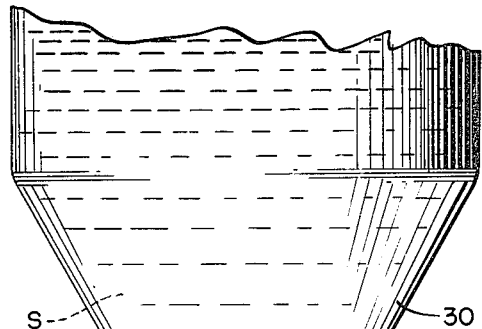
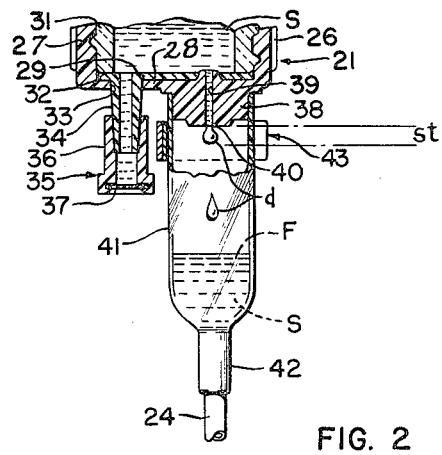
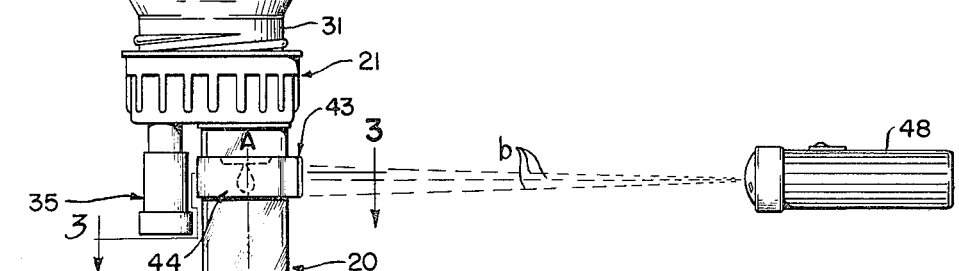
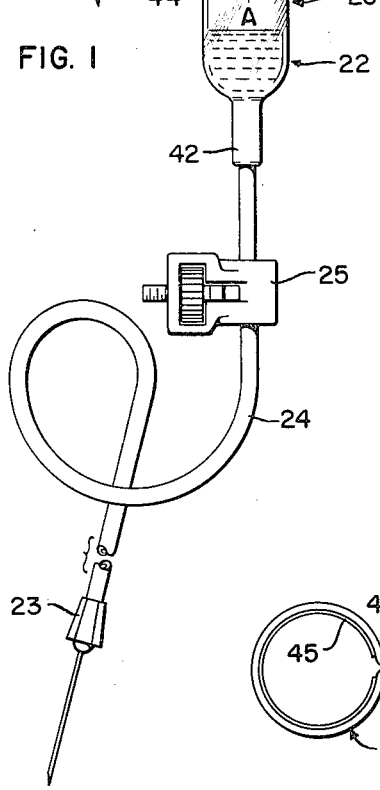
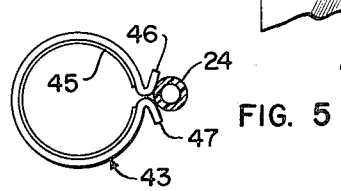
INVENTORS:
JOHN H. SCHNEIDER
GLENN L. BEALL
BY Joseph J. Grass
ATTORNEY INVENTORS:
JOHN H. SCHNEIDER
GLENN L. BEALL
BY Joseph J. Grass
ATTORNEY

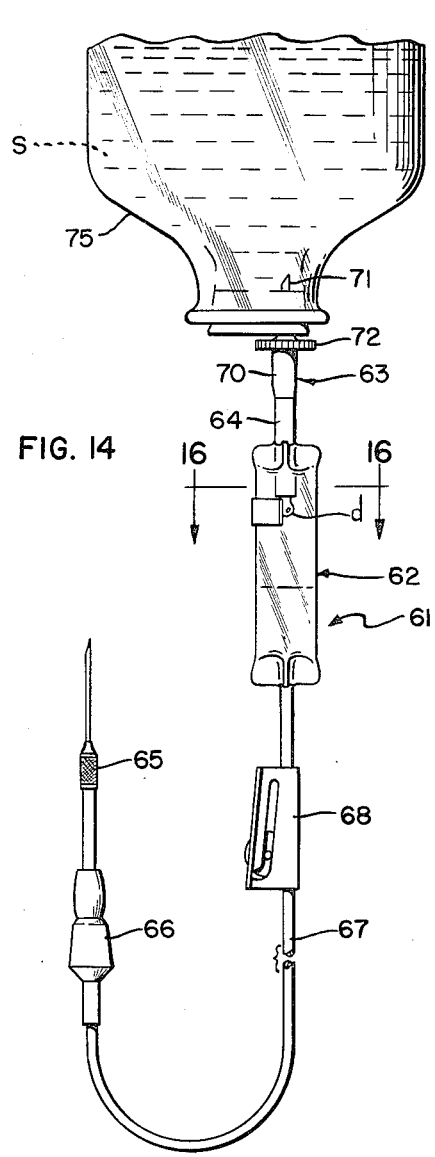

3,217,709
DRIP METER WITH REFLECTOR FOR FACILITATING THE COUNTABILITY OF TRANSPARENT AND TRANSLUCENT DROPS OF LIQUID AT LOW LEVELS OF GENERAL ILLUMINATION
John H. Schneider, Lake Bluff, and Glenn L. Beall, Wildwood, Ill., assignors to Abbott Laboratories, North Chicago, Ill., a corporation of Illinois
Filed Dec. 27, 1962, Ser. No. 247,677
1 Claim. (Cl. 128—214)

This invention relates to a device for facilitating the countability of both transparent and translucent drops of liquid at low levels of general illumination.

At times it becomes necessary for a parenteral solution to be administered to a patient when there is a low level of general illumination in the patient's room, for example at night when there is either no light in the patient's room or when only a small night-light is lit. The fact that often a patient's room has a low level of general illumination is one of choice. High levels of general illumination tend to prevent the patient from securing proper sleep which is especially necessary during convalescence.

A typical parenteral solution administration apparatus, with which the device of the invention is employable, includes a connector connectable to a source a parenteral solution, a drip chamber having a drop former and leading from the connector, and a length of tubing connected at one end to the drip chamber and the other end to a hypodermic needle. The drop former has a central axis. It has been the practice in the past for an attendant to direct a flashlight beam toward the drip chamber so that the flow rate, evidenced by the drops formed in the drip chamber, was able to be determined. At the low levels of general illumination described above, it was difficult to count the drops even with the aid of a flashlight beam unless the attendant was quite close to the drip chamber.

It is accordingly one of the purposes of the invention to provide a device for facilitating the countability of both transparent and translucent drops of liquid at low levels of general illumination and at substantial distances employing a reflective surface which redirects a beam of light received from a source into the successive drops as they are formed, thereby facilitating the countability of the drops. The redirected light illuminates each drop as it is being formed. The device of the invention is extremely simple in construction and yet it is effective in use.

One manner of carrying out the invention is to slip a resilient clip around the drip chamber; the resilient clip has a reflective surface facing the central axis of the drop former at the stratum where the drops are formed. Because of the resilience of the clip, the clip is able to be slipped onto the drip chamber and to hold itself frictionally in position. Another manner of carrying out the invention is to mount a device having a reflective surface on a connector which is adapted to be connected to a source of parenteral liquid. The reflective surface faces the central axis of the drop former at the stratum where the drops are formed. Another manner of carrying out the invention is to provide one or more localized deposits of material on the drip chamber at the stratum where the successive drops are formed. The deposits of material each have a reflective surface directed toward the central axis of the drop former at the stratum where the drops are formed. Another manner of carrying out the invention is to provide a band which encircles the drip chamber, with the band having one and preferably a plurality of apertures therein. The band has a reflective surface disposed at a stratum where the drops are formed and which faces a central axis of the drop former. The illuminated drops are visible as they are formed through the aperture or apertures. Another manner of carrying out the invention is to secure a piece of material having a reflective surface to the drip chamber by a transparent adhesive, with the transparent adhesive disposed between the piece of material having the reflective surface and the drip chamber. The reflective surface faces the central axis of the drop former at the stratum where the drops are formed.

The device of the invention, in its various embodiments, is useful in facilitating the countability of both transparent and translucent drops of liquid. It is a requirement that the drops be of a character that a substantial amount of the redirected light passes therethrough. A five percent dextrose in water solution satisfies this requirement while an opaque liquid like whole blood does not.

The drop is distinctly visible under the above-described conditions of illumination when employing the device of the invention at the time when the drop is almost complete as best shown in FIGURE 4 of the illustrative drawings. The drop serves as a lens at that time.

With regard to the drip chamber, it is necessary, in order to carry out the invention, that the drip chamber be transparent at least at the stratum where the drops are formed, but for practical purposes the entire drip chamber is preferably transparent.

In the diagrammatic, illustrative drawings:

FIGURE 1 is a side elevational view showing a typical parenteral solution administration apparatus and one embodiment of a device for facilitating the countability of both transparent and translucent drops of liquid at low levels of general illumination, and a flashlight for use therewith;

FIGURE 2 is a front elevational view of a fragmentary portion of the apparatus shown in FIGURE 1 of the illustrative drawings and of the embodiment of the device of the invention shown therein;

FIGURE 3 is a cross-sectional view taken along line 3—3 of FIGURE 1;

FIGURE 4 is a fragmentary front elevational view taken along line 4—4 of FIGURE 3;

FIGURE 5 is a view showing the device of the invention being assembled onto a length of tubing;

FIGURE 14 is a side elevational view showing an alternative form of a typical parenternal administration apparatus and another embodiment of the device of the invention;

FIGURE 15 is a front elevational view showing a fragmentary portion of the parenteral administration apparatus and the embodiment of the device also shown in FIGURE 14;

FIGURE 16 is a cross-sectional view taken along line 16—16 of FIGURE 14; and

FIGURE 17 is an enlarged fragmentary view showing a piece of material having a reflective surface secured to the drip chamber by a transparent adhesive.

Figure 6:
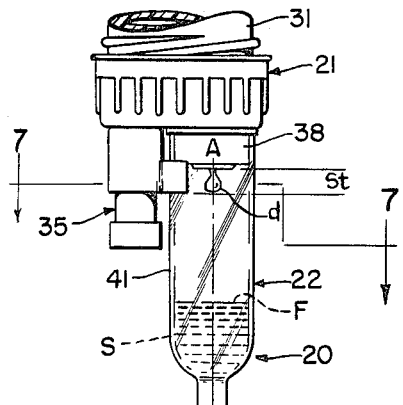
FIGURE 6 is a side elevational view showing a fragmentary portion of the parenteral solution administration apparatus and another embodiment of the device of the invention.

Referring now to FIGURES 1 and 2 of the illustrative drawings, there is shown a parenternal solution administration apparatus generally indicated at 20. The apparatus 20 is shown to include a connector generally indicated at 21, a longitudinally extending drip chamber generally indicated at 22, a hypodermic needle 23, and a length of tubing 24 connected at one end to the hypodermic needle 23 and at the other end to the drip chamber 22. An adjustable tubing clamp 25 is disposed along the length of tubing 24.

The connector 21 is shown to include a threaded cap 26 having an internally threaded side wall 27 and an end wall 28. The cap 26 is preferably composed of a substantially rigid material for example rubber modified polystyrene, rubber modified methylmethacrylate and the like. The connector 21 is also shown to include a liner 29, preferably composed of a somewhat resilient plastic material for example low density polyethylene, polyvinyl chloride or rubber, which is shown to overlie the end wall 28. A liquid container 30, containing a transparent or translucent parenteral solution S, for example, a five percent dextrose and water solution, is shown to have a threaded neck 31 having a terminal end 32. The threaded neck 31 is shown to be in engagement with the threaded cap 26 and its terminal end 32 is shown to be in abutment with the marginal edge of the liner 29 as best shown in FIGURE 2 of the illustrative drawings. The end wall 28 is shown to have an aperture 33 through which a tubular air vent generally indicated at 34, integral with the liner 29, depends. An air filter assembly generally indicated at 35 is shown to have a tubular body 36 which is shown to be frictionally held on the tubular air vent 34. The air filter assembly 35 also includes an air filter disk 37 which is impervious to dust, dirt, bacteria and parenteral liquids but is pervious to air. Integrally formed with the end wall 28 is a tubular portion 38 having a passage 39 formed therein. The terminal end of the passage 39 defines a drop former 40 which is adapted to form successive drops $d$. The drop former 40 has a longitudinally extending central axis A—A. The passage 39 is in communication with the solution S in the liquid container 30. The drip chamber 22 is preferably composed of a somewhat resilient material. The drip chamber 22 is preferably flexible enough so that it can be pumped during use. However, if desired, a rigid drip chamber is employable.

The drip chamber 22 is shown to have a longitudinally extending side wall 41 and a tubular outlet 42 wherein one end of the length of tubing 24 is secured preferably by solvent sealing. The side wall 41 receives the tubular portion 38 and is solvent sealed thereto. The drip chamber 22 is shown to have a floor F defined by the upper surface of the parenteral solution S. The drip chamber 22 is preferably entirely transparent but for the purposes of the invention the drip chamber is only required to be transparent at a transverse stratum $St$ where the drops are formed.

Having described a typical parenteral solution administration apparatus 20, reference is now made to the embodiment of FIGURES 1, 2, 3, 4 and 5 of the illustrative drawings wherein there is shown a device generally indicated at 43 for facilitating the countability of the drops $d$ of the parenteral solution S at low levels of general illumination. The device 34 of the invention is shown to include a generally arcuate flexible resilient clip 44 having a reflective surface 45. The resilient clip 44 is composable of a resilient metal like spring steel, beryllium copper or a resilient plastic like polycarbonate, nylon or rubber modified polystyrene, as shown. The reflective surface 45 is formed in any convenient manner for example by polishing the inner surface of the clip 44 to a mirror-like surface in the event the clip 44 is composed of a suitable metal, or by coating the inner surface of the clip 44 with a reflective material for example by vacuum metalizing the inner surface of the clip 44 as shown or by vacuum metalizing the entire surface of the clip 44. Also, the ends of the clip 44 are shown to be provided with outwardly extending flanges 46 and 47. The outwardly extending flanges 46 and 47 enable the clip 44 to be snapped over the tubing 24 from a starting position shown in FIGURE 5 of the illustrative drawings. When the clip 44 has been snapped over the length of tubing 24, the clip 44 is moved along the length of tubing 24 and then slipped onto and along the drip chamber 22 into the position shown in FIGURES 1, 2, 3 and 4 of the illustrative drawings. As the clip 44 is being slipped onto and along the drip chamber 22 the flanges 46 and 47 serve as finger-engageable handles to spread the clip 44 to facilitate the proper positioning of the clip 44. Although the flanges 46 and 47 are provided, the device 34 functions as a reflector with or without the flanges 46 and 47. The arcuate extent of the clip 44 is required to be at least slightly more than 180 degrees to insure adequate gripping and less than 360 degrees, that is, the opening between the flanges 46 and 47 is required to be at least as wide as the drops $d$ to permit visual observation thereof.

The reflective surface 45 of the device 43 is shown to be disposed at the transverse stratum $St$ which extends transversely to the longitudinally extending drip chamber 22. The drops $d$ are shown to be formed by the drop former 40 along the central axis A—A of the drop former 40 at the place where the axis A—A interests the stratum $St$. The reflective surface 45 is shown to face the central axis A—A so that when a beam of light $b$ is directed against the reflective surface 45, the beam of light $b$ will be redirected into each of the successive drops $d$ to render them visible. A suitable source of light is indicated in FIGURE. 1 to be a conventional flashlight 48 which sends out the beam of light $b$. In the event the clip 44 with the reflective surface 45 extends slightly downwardly beyond the stratum $St$, approximately the same result is achieved.

Figure 8:
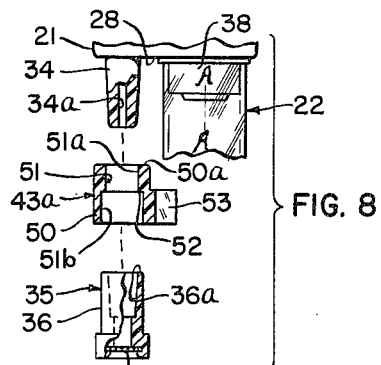
FIGURE 8 is an exploded view showing a fragmentary portion of the parenteral solution administration apparatus and the alternative embodiment of the device of the invention shown in FIGURES 6 and 7.
Figure 7:
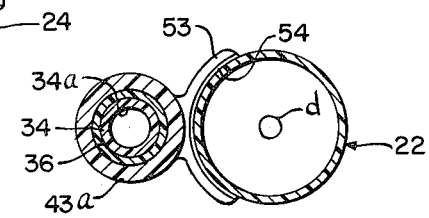
FIGURE 7 is a cross-sectional view taken along line 7—7 of FIGURE 6.

Referring now to the embodiment of FIGURES 6 through 8 of the illustrative drawings, there is shown a fragmentary portion of the same parenteral solution administration apparatus 20 as shown and described in reference to FIGURES 1, 2, 3 and 4 of the illustrative drawings and hence like reference characters have been used for the sake of brevity. Another embodiment of the device of the invention, generally indicated at 43A, is shown to have a tubular reflector body 50 having a bore generally indicated at 51. An internal shoulder 52 in the tubular body 50 divides the bore 51 into an upper bore portion 51a and a lower bore portion 51b. Integral with the tubular reflector body 50 is an arcuate member 53 which is shown to have the same radius as and is shown to abut against the outer surface of the longitudinally extending side wall 41 of the drip chamber 22. The arcuate member 53 is shown to have a reflective surface 54 which is disposed at the transverse stratum $St$ and which faces the central axis A—A.

When the device 43A is in the position indicated in FIGURE 6 of the illustrative drawings, a terminal upper end 50a of the reflector body 50 is in abutment with the end wall 28 of the cap 26. An upper terminal end 36a of the tubular body 36 of the air filter assembly 35 is in abutment with the internal shoulder 52 of the reflector body 50. Although the upper bore portion 51a is sufficient to hold the device 43A in position frictionally, the air filter assembly 35, upon abutment of its terminal end 36a with the internal shoulder 52, frictionally engages the tubular air vent 34. It is readily apparent, therefore, that the reflector body 50 is held in position between the end wall 28 of the connector 21 and the air filter assembly 35.

The device 43A is preferably composed of a plastic material, for example polystyrene or polycarbonate, and the reflective surface 54 is formed thereon, for example by coating, preferably by vacuum metalizing. It is simpler to vacuum metalize the entire device 43A exclusive of the passageway 51 and equally good results are obtained in use.

Figure 9:
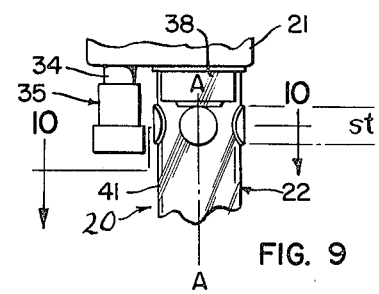
FIGURE 9 is a side elevational view showing a fragmentary portion of the parenteral solution administration apparatus and another embodiment of the device of the invention.
Figure 10:
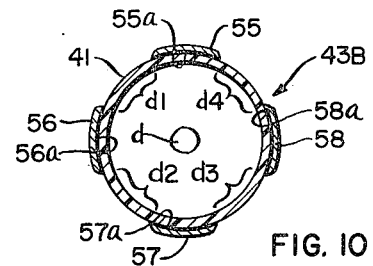
FIGURE 10 is a cross-sectional view taken along line 10—10 of FIGURE 9.

Referring now to the embodiment of FIGURES 9 and 10 of the illustrative drawings, there is shown a fragmentary portion of a parenteral solution administration apparatus 20 like that shown and described in reference to FIGURES 1, 2, 3 and 4 of the illustrative drawings and hence like reference characters are employed. In the embodiment of FIGURES 9 and 10 of the illustrative drawings, there is shown a modified form of a device of the invention generally indicated at 43B. The device 43B simply takes the form of what is shown to be four deposits of material 55, 56, 57 and 58 having reflective surfaces 55a, 56a, 57a and 58a, respectively, although one such deposit of material is sufficient to accomplish the purposes of the invention. Each of the deposits of material 55, 56, 57 and 58 are preferably as large as the sucessive drops d. A distance d1 between the deposits of material 55 and 56, a distance d2 between the deposits of material 56 and 58, a distance d3 between the deposits of material 57 and 58, and a distance d4 between the deposits of material 55 and 58 should each be as large as, and preferably larger than, the width of the drops d to insure that the user will be able to observe the full brilliance of the glow which emanates from the drops d. The deposits of material 55, 56, 57 and 58 are formable by the application of a suitable material, for example, a reflective foil applied by heat, aluminum paint, a silver metal deposit or the like.

Figure 13:
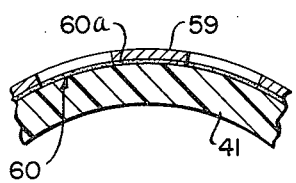
FIGURE 13 is a cross-sectional enlarged fragmentary view showing the relation of a band and its reflective surface to a drip chamber.
Figure 12:
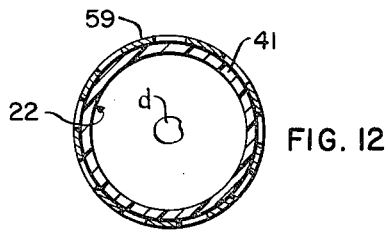
FIGURE 12 is a cross-sectional view taken along line 12—12 of FIGURE 11.
Figure 11:
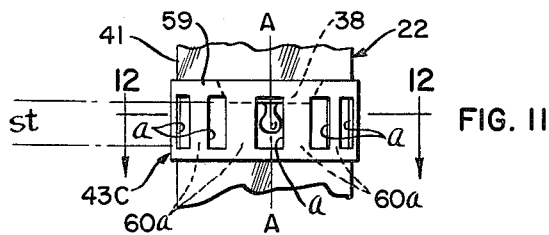
FIGURE 11 is a front elevational view showing a fragmentary portion of the drip chamber and another embodiment of the device of the invention.

Referring now to the embodiment of FIGURES 11 through 13 of the illustrative drawings, the same reference characters are employed to designate the parenteral solution administration apparatus 20 as shown and described in reference to FIGURES 1, 2, 3 and 4 of the illustrative drawings. There is shown in the embodiment of FIGURES 11 through 13 of the illustrative drawings an embodiment of a device generally indicated at 43C. The device 43C is shown to include a band 59 having an inner reflective surface generally indicated at 60. The band frictionally embraces the longitudinally extending side wall 41 of the drip chamber 22. The band 59 is of a character to be composed of any suitable material such as metal as shown or plastic. The band 59 is shown to have a plurality of apertures a, preferably nine in number. Although nine apertures are shown in the illustrative drawings only one is necessary in the embodiment of FIGURES 11 through 13 of the illustrative drawings. The apertures a should be at least as large as, and preferably larger than, each drop d. Reflective surfaces 60a between adjacent apertures a, are disposed at the transverse stratum St in which the drops d are formed. The reflective surfaces 60a face the central axis A—A.

Referring now to the embodiment of FIGURES 14 through 17 of the illustrative drawings, there is shown a somewhat different, typical alternate form of parenteral solution administration apparatus generally indicated at 61. The apparatus 61 is shown to include a transparent longitudinally extending drip chamber generally indicated at 62, a connector generally indicated at 63, a length of tubing 64 connecting the connector 63 and the drip chamber 62, a hypodermic needle 65 shown to be engaged with a connector 66, and a length of tubing 67 connecting the drip chamber 62 and the connector 66. An adjustable tubing clamp 68 is shown to be disposed along the length of tubing 67. The connector 63 is shown to take the form of a piercing cannula 70 having a piercing end 71. The piercing cannula 70 is provided with a conventional finger-engageable handle 72. The piercing cannula 70 is shown to be frictionally held position by a pierceable bottle stopper 73 which is shown to be received in a neck 74 of a glass liquid container 75. The liquid container 75 is shown to contain a parenteral solution S which is either transparent or translucent.

The length of tubing 64 is shown to be joined to the drip chamber 62 by a seal 76 which is formed by heat sealing die means (not shown). A lower terminal end 64a of the length of tubing 64, shown to extend to below an upper end wall 77 of the drip chamber 62, defines a drop former. A device 43D for facilitating the countability of clear drops of liquid at low levels of general illumination is shown to include a piece of material 78 having a reflective surface 78a disposed at a transverse stratum St and faces a central axis A'—A'. The piece of material 78 is adhesively secured to a longitudinally extending side wall 79 of the drip chamber 62 by a conventional transparent adhesive 80. The preferred arcuate extent of the piece of material 78 along the outer surface of the side wall 79 of the drip chamber 62 is preferably 120 degrees although a lesser or greater extent is employable so long as the piece of material 78 having the reflective surface 78a, has an arcuate extent which is at least as wide as a drop d. In the event the arcuate extent of the piece of material 78 with the reflective surface 78a almost completely encircles the side wall 79, the distance between ends 81 and 82 should be at least as great as the width of the drops d.

It is to be understood that the piece of material 78 is of a character to be held in position by pressure sensitive tape as an equivalent alternative to the transparent adhesive 80, if desired.

In use, all of the embodiments effectively accomplish the purpose of the invention, namely, to illuminate each of the drops as they are formed by the drop former to facilitate countability. Taking the embodiment of FIGURES 1, 2, 3, 4 and 5 of the illustrative drawings as an example, assuming low levels of general illumination for example a dark hospital room, the attendant would direct the flashlight beam b at the device 43 so that the beam of light b strikes the reflective surface 45. As the drop d is being formed by the drop former 40 at the stratum St along the central axis A—A, the reflective surface 45 redirects the beam of light b into the drop d. The drop d is either transparent or translucent since the solution S, for example a five percent dextrose solution is also the same character and consequently the drop d is illuminated. When the drop d is completely formed, it falls downwardly to below the stratum St and onto the floor F in the drip chamber 22. The next drop d is likewise illuminated in response to the beam of light b. The attendant can easily count the drops at low levels of general illumination from distances substantially greater than heretofore possible by employing the simple device of the invention. Visual observation of the drop from distances as great as 24 feet yields good results. The other embodiments of the invention work in the same manner as that described in reference to the embodiment of FIGURES 1, 2, 3, 4 and 5 of the illustrative drawings.

In all the embodiments of the invention the reflective surfaces are considered to be disposed proximate to their associated respective drip chambers 22 and 62. In the embodiment of FIGURES 6 through 8 of the illustrative drawings, the reflective surface 54 is actually shown to be in contact with the drip chamber, however, if desired, the reflective surface 54 is of a character to be slightly spaced therefrom. In the embodiment of FIGURES 14 through 17 of the illustrative drawings, the reflective surface 78a is spaced from the drip chamber 62 by the transparent adhesive 80. It is, therefore, readily apparent that the reflective surface need not be in direct contact with the drip chamber but can be slightly spaced therefrom. It is necessary, however, for the reflective surface to be disposed in such a location that it will redirect a beam of light into the drops as they are successively being formed.

The above-described embodiments being exemplary only, it is to be understood that modifications in form or detail are within the purview of the invention. Acordingly, the invention is not to be considered as limited save as is consonant with the scope of the following claim.

What is claimed is:

A device for facilitating the countability of transparent and translucent drops of liquid at low levels of general illumination, comprising: a connector having a connector body adapted to be secured to a liquid container, a longitudinally extending drip chamber depending from said connector and including a drop former for forming successive drops, said drop former having a longitudinally extending central axis, each drop being formable at a transverse srtatum intersected by said axis, said drip chamber being transparent at least at said stratum, said connector having a depending tubular air vent, a tubular reflector body received by said tubular air vent, said tubular body being abuttable against said connector body, said tubular body having an internal shoulder, and an air filter assembly having a passage therein frictionally received by said tubular air vent and abuttable against said shoulder, said reflector body including an integral arcuate member having a concave reflective surface substantially co-extensive with said stratum adjacent said drip chamber disposed at said stratum and facing said central axis, whereby a direct beam of light directed against said reflective surface will be redirected into each of the successive drops to render them visible.

References Cited by the Examiner

UNITED STATES PATENTS

| | | | |
|---|---|---|---|
| 307,775 | 11/1884 | Kirk et al. | 184—97 |
| 545,727 | 9/1895 | Rockstroh et al. | 184—97 |
| 786,167 | 3/1905 | Sherman | 184—96 |
| 890,742 | 6/1908 | Whitney | 73—327 |
| 2,133,598 | 10/1938 | Torbert | 88—94 |
| 3,030,954 | 4/1962 | Thorton | 128—214 |
| 3,045,528 | 7/1962 | Norgren | 88—14 |

RICHARD A. GAUDET, *Primary Examiner.*

JORDAN FRANKLIN, *Examiner.*